(12) United States Patent
Asai et al.

(10) Patent No.: US 6,888,601 B2
(45) Date of Patent: May 3, 2005

(54) LATERAL ELECTRIC FIELD LIQUID CRYSTAL DISPLAY DEVICE

(75) Inventors: Takuya Asai, Tokyo (JP); Syouichi Kuroha, Tokyo (JP); Takeshi Sasaki, Tokyo (JP)

(73) Assignee: NEC LCD Technologies, Ltd., Kanagawa (JP)

( * ) Notice: Subject to any disclaimer, the term of this patent is extended or adjusted under 35 U.S.C. 154(b) by 0 days.

(21) Appl. No.: 10/353,023

(22) Filed: Jan. 29, 2003

(65) Prior Publication Data

US 2003/0142259 A1 Jul. 31, 2003

(30) Foreign Application Priority Data

Jan. 30, 2002 (JP) .................................. 2002-021184

(51) Int. Cl.[7] .............................................. G02F 1/1343
(52) U.S. Cl. ........................ 349/141; 349/38; 349/139
(58) Field of Search ................................ 349/141, 139, 349/38, 43, 138, 147

(56) References Cited

U.S. PATENT DOCUMENTS 5,598,285 A * 1/1997 Kondo et al. ................. 349/39
6,049,369 A * 4/2000 Yanagawa et al. .......... 349/141
6,208,399 B1 * 3/2001 Ohta et al. .................. 349/139

FOREIGN PATENT DOCUMENTS

| JP | 07-36058 | 2/1995 |
|----|----------|--------|
| JP | 09-318972 | 12/1997 |
| JP | 10-153796 | 6/1998 |
| JP | 10-260431 | 9/1998 |
| JP | 2000-56324 | 2/2000 |
| JP | 2000-162639 | 6/2000 |
| KR | 1999-26586 | 4/1999 |
| KR | 2000-31004 | 6/2000 |

OTHER PUBLICATIONS

Japanese Office Action dated Dec. 16, 2003 with partial translation.

* cited by examiner

Primary Examiner—Toan Ton
(74) Attorney, Agent, or Firm—McGinn & Gibb pllc

(57) ABSTRACT

In a lateral electric field liquid crystal display device, a major electrode portion for generating a lateral electric field is formed using a layer different from a layer on which other electrodes and lines are formed. In this case, the major portion is formed to have a thickness of ½₀ to ⅓ of the thickness of each of the other electrodes and lines. Thus, flatness of a base film of an alignment layer is significantly improved, also alignment layer material can be coated and formed with high flatness on the base film, and rubbing of the alignment layer material can be performed uniformly for the overall substrate surface.

19 Claims, 4 Drawing Sheets

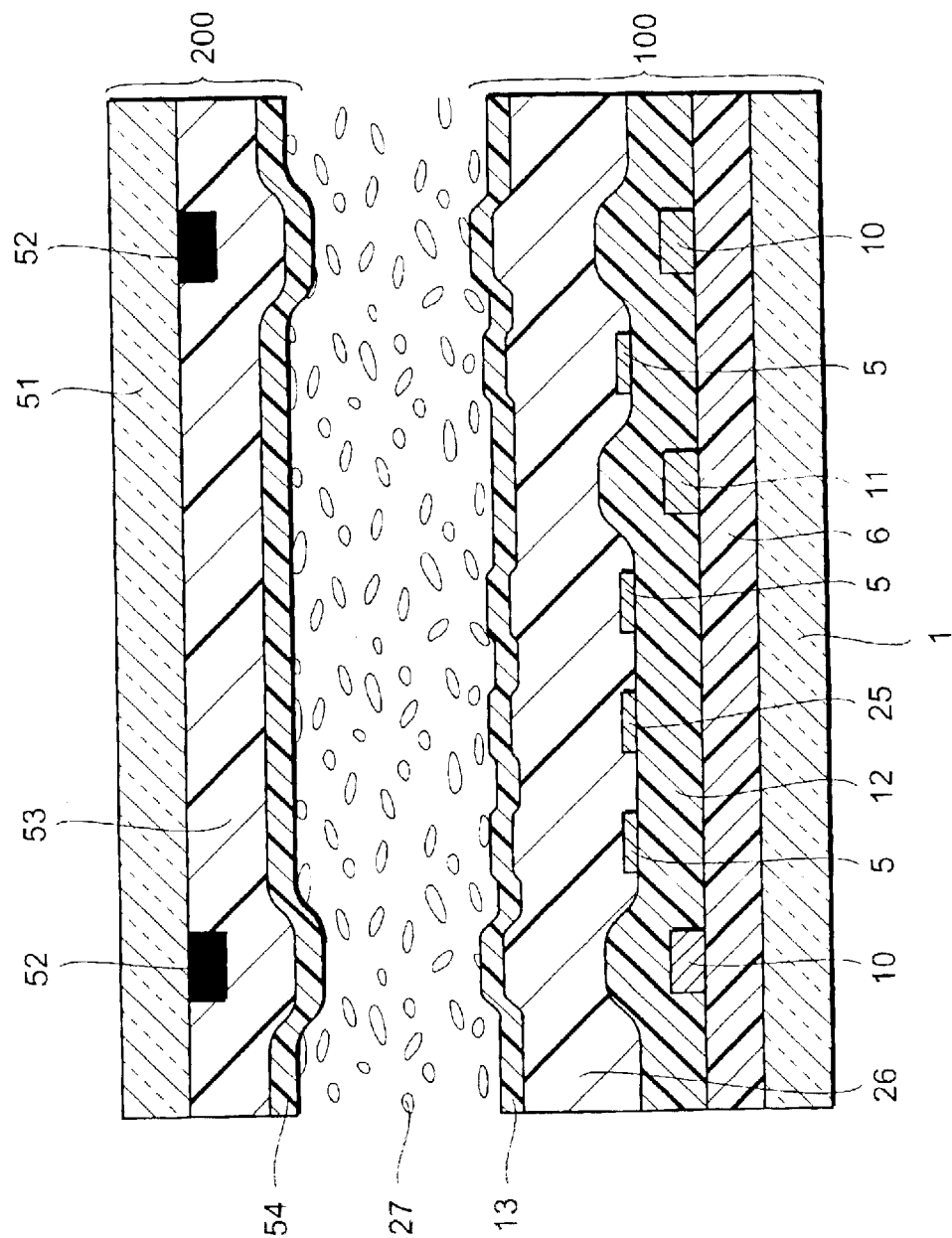

LATERAL ELECTRIC FIELD LIQUID CRYSTAL DISPLAY DEVICE

BACKGROUND OF THE INVENTION

1. Field of the Invention

The present invention relates to a lateral electric field liquid crystal display device. More specifically, the present invention relates to an electrode structure of an active element substrate.

2. Description of the Related Art

In general, a lateral electric field liquid crystal display device is constructed such that a pixel electrode and a common electrode are provided on the same, substrate, and an electric field is applied therebetween. Each pixel electrode is connected to an active element, such as a thin-film transistor (TFT), to constitute an active matrix substrate (TFT substrate). Liquid crystal is filled between the TFT substrate and an opposing substrate. In this lateral electric field liquid crystal display device, since the liquid crystal is controlled by the electric field applied parallel to a substrate surface, a wide viewing angle can be obtained.

The TFT substrate of the type described above will be explained with reference to FIGS. 1 and 2. FIG. 1 is a plan view of one pixel of the TFT substrate of the conventional liquid crystal display device as viewed from the side of liquid crystal. FIG. 2 is a cross-sectional view taken along the line X–X' of FIG. 1.

A scanning line 103, a gate electrode 102 connected to the scanning line 103, a common line 104, and a common electrode 105 extending as a part of the common line 104 are formed of a metal film in the same layer on a transparent insulation substrate 101 formed of, for example, glass. A gate insulating film 106 is formed over these lines and electrodes. The common electrode 105 is partially formed parallel to a pixel electrode described below. Subsequently, a semiconductor island 107 is formed on the gate insulating film 106. Thereafter, a signal line 110, source/drain electrodes 108 and 109 of a TFT, both of which are partially formed on the semiconductor island 107 to be connected thereto, and a pixel electrode 111 connected to the source/drain electrode 109 are formed using the same metal film as that used to form the source/drain electrode. Note that both the pixel electrode 111 and the previously formed common electrode 105 are partially formed in parallel with each other. In addition, an interlayer insulating film 112 and an alignment layer 113 are formed in such a manner as to cover the semiconductor island 107, the source/drain electrodes 108 and 109, and the pixel electrode 111. In this manner, formation of TFT substrate 300 is completed. Note that a storage capacitor is formed where the pixel electrode 111 and the common line 104 overlap each other (an overlap portion 122 indicated as a cross-hatched portion).

Light shielding film 152 is formed on the transparent insulation substrate 151 to partition pixels on the TFT substrate 300 and cover the semiconductor island 107. An insulating film 153 and an alignment layer 154 are formed to cover the light shielding films 152, thereby constituting an opposing substrate 400.

Liquid crystal 127 is filled between the TFT substrate 300 and the opposing substrate 400 thus to form a liquid crystal display device. In FIG. 2, a polarizer and the like are not shown for simplification.

It should be note that the scanning line 103, the common line 104 and the signal line 110 are formed to have enough thickness to reduce resistance values thereof. Since the common line 104 and the common electrode 105 are formed together with the scanning line 103, all of which have the same thickness. Consequently, as shown in FIG. 2, the interlayer insulating film 112 covering these electrodes and lines is formed with large variation in a height of step. In this case, when an alignment layer material coated having large height of step on the interlayer insulating film 112 is subjected to a rubbing process, the material cannot be rubbed uniformly over the TFT substrate. As a consequence, the alignment layer 113 is formed unevenly due to nonuniformity of rubbing, thereby making the liquid crystal display device have nonuniformity of display.

SUMMARY OF THE INVENTION

An object of the present invention is therefore to provide a lateral electric field liquid crystal display device configured to have an insulating film formed below an alignment layer and with reduced height of its steps in order to perform rubbing uniformly over the alignment layer.

According to the present invention, there is provided a lateral electric field liquid crystal display device including a TFT substrate, an opposing substrate and a liquid crystal layer sandwiched between the TFT substrate and the opposing substrate, in which the TFT substrate includes a signal line, a common line, a pixel electrode and a common electrode. The liquid crystal display device thus configured is characterized in that the pixel electrode is partially formed in a layer different from and above the signal line and the common line, the common electrode is formed in the layer, and the common electrode and a portion of the pixel electrode formed in the layer is formed thinner than the signal line and the common line.

The liquid crystal display device thus configured is further characterized in that the pixel electrode further comprises an auxiliary capacitive electrode formed in the same layer as that used for the signal line and formed to overlap the common line.

The liquid crystal display device thus configured is further characterized in that the portion of the pixel electrode is connected to a drain electrode of a thin film transistor (TFT) through a contact hole and the common electrode is connected to the common line through a contact hole.

The liquid crystal display device thus configured is still further characterized in that the TFT substrate further includes a transparent substrate, a scanning line formed on the transparent substrate, a gate insulating film formed on the transparent substrate to cover the scanning line, a semiconductor layer formed on the gate insulating film, a first interlayer insulating film formed on the gate insulating film to cover the semiconductor film, a second insulating film formed on the first insulating film, and an alignment layer formed on the second insulating film. The above-described liquid crystal display device is further constructed such that the common line is formed on the transparent substrate together with the scanning line, the signal line is formed between the gate insulating film and the first interlayer insulating film and is connected to one end of the semiconductor film, the pixel electrode includes a lower-layer pixel electrode formed on the gate insulating film together with the signal line and connected to the other end of the semiconductor film, the common electrode is formed between the first interlayer insulating film and the second interlayer insulating film and connected to the common line, the pixel electrode further includes an upper-layer pixel electrode formed on the first interlayer insulating film together with the common electrode and connected to the lower-layer pixel electrode, and the upper-layer pixel electrode is thinner than the signal line and the common line.

The liquid crystal display device thus constructed is further characterized in that a thickness of each of the common electrode and the upper-layer pixel electrode is in a range of twentieth to third of a thickness of each of the signal line and the common line.

Therefore, flatness of an underlying film for an alignment layer is significantly improved and a material for the alignment layer also can be formed with high flatness on the underlying film, and further, rubbing of the material for the alignment layer can therefore be performed uniformly over the substrate. Consequently, the uniformly rubbed alignment layer is obtained and the liquid crystal display device is able to significantly reduce display failure due to unevenness of rubbing.

BRIEF DESCRIPTION OF THE DRAWINGS

In the accompanying drawings:

FIG. 4 is a cross-sectional view taken along the line X–X' of FIG. 3.

DETAILED DESCRIPTION OF THE PREFERRED EMBODIMENTS

Figure 3:
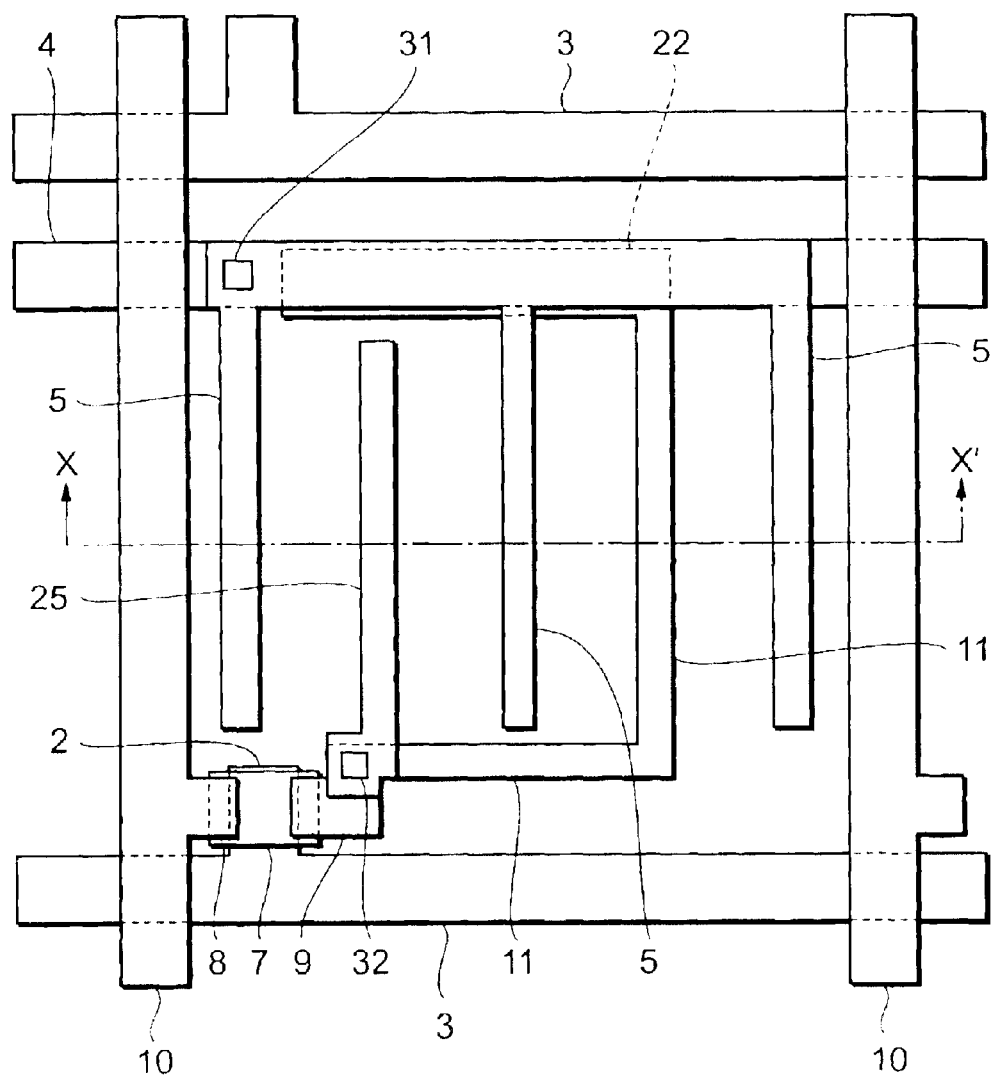
FIG. 3 is a plan view of one pixel portion of a TFT substrate of a liquid crystal display device according to the present invention.

Hereinbelow, an embodiment of a liquid crystal display device according to the present invention will be described with reference to FIGS. 3 and 4.

A metal film (of Cr, Al, or Ta, or an alloy of the foregoing metals) having a thickness of 200 to 500 nm is patterned on a transparent insulation substrate 1 formed of, for example, glass in order to simultaneously form a scanning line 3, a gate electrode 2 connected to the scanning line 3, and a common line 4. Thereafter, a gate insulating film 6 (such as an SiNx film having a thickness of 400 to 600 nm) is formed over the substrate. Then, a semiconductor island 7 (of, for example, amorphous silicon or polysilicon) is formed on the gate insulating film 6. Thereafter, a metal film (of Cr, Al, or Ta, or an alloy of the foregoing metals) having a thickness of 200 to 500 nm is deposited and then patterned in order to form a signal line 10, source/drain electrodes 8, 9, and a first pixel electrode 11 (lower layer pixel electrode) connected to the source/drain electrode 9. As shown in FIG. 3, the first pixel electrode 11 is formed to include a capacitive electrode 22 overlapping the common line 4 in addition to electrodes parallel to later formed common electrodes 5. The common line 4 and the capacitive electrode 22 form an auxiliary capacitor. Thus, the lower-layer pixel electrode also serves as a capacitive storage electrode.

A first interlayer insulating film 12 of, for example, SiNx, having a thickness of 200 to 400 nm is deposited over the substrate to cover the semiconductor island 7, the source/drain electrodes 8, 9, the signal line 10, and the first pixel electrode 11. Subsequently, a contact hole 31 for common electrode and a contact hole 32 for pixel electrode are formed in the insulating film so that portions of the insulating film positioned above the common line 4 and the source/drain electrode 9 are opened.

A metal film (of Cr, Al, or Ta, or an alloy of the foregoing metals) having a thickness of 20 to 120 nm is deposited as a film thinner than the signal line 10 over the first interlayer insulating film 12, preferably to a thickness of twentieth to third of the thickness of the signal line 10, and then patterned to form the common electrodes 5 connected to the common line 4 through the contact hole 31 for common electrode and a second pixel electrode 25 (upper-layer pixel electrode) connected to the source/drain electrode 9 through the contact hole 32 for pixel electrode. In this case, a lower limit of the thickness of the common electrodes 5 and the second pixel electrode 25 is based on a desired ratio of resistance of the common electrode (and the upper-layer pixel electrode) to resistance of the common line (and the signal line). An upper limit of the thickness thereof is based on a desired height of the step formed by the insulating film below the alignment layer. The common electrodes 5 and the second pixel electrode 25 are formed in parallel with each other and, in addition, the common electrodes 5 and the first pixel electrode 11 are formed in parallel with each other. Furthermore, the second pixel electrode 25 is formed so as not to overlap the first pixel electrode 11.

A second interlayer insulating film 26 made of, for example, SiNx and having a thickness of 600 to 800 nm is deposited over the substrate to cover the common electrodes 5 and the second pixel electrode 25. Subsequently, a material for an alignment layer is coated thereon to a thickness of 80 to 120 nm and then rubbed to form an alignment layer 13. In this manner, formation of TFT substrate 100 is completed.

An opposing substrate 200 disposed opposite the TFT substrate 100 is generally formed in the following manner.

First, a light shielding film 52 is formed on a transparent insulation substrate 51 so that the film partitions the individual pixels of the TFT substrate 100 and corresponds to the semiconductor island 7. Then, an insulating film 53 and an alignment layer 54 are formed over the substrate to cover the light shielding film 52.

Liquid crystal 27 is filled between thus formed TFT substrate 100 and opposing substrate 200 to provide a liquid crystal display device. In FIG. 4, a polarizer, etc., are not shown for simplicity.

As described above, the second pixel electrode 25, the common electrodes 5, etc. are formed in the layer different from the layer used for the signal line 10 and the common line 4 that allow a large amount of current. Thus, the thickness of the metal film constituting the second pixel electrode 25 and the common electrodes 5 can be determined independently of the thickness of the signal line, the common line, etc. Consequently, the metal film constituting the pixel electrode and the common electrode can be formed to a thickness thinner than the signal line, the common line, etc., thereby allowing reduction of height of steps formed by the surface of the second interlayer insulating film 26 located on the metal film.

As described above, one set of the common electrodes 5 and the second pixel electrode 25 for generating the lateral electric field is formed of the metal film having a thickness of 20 to 120 nm, which thickness is significantly smaller than that of the conventional metal film, i.e., 200 to 500 nm, and in addition, has thereunder no lines and electrodes that produce height of steps, thereby allowing the second interlayer insulating film 26 to significantly reduce height of its steps, which height is significantly smaller than that observed in the conventional case.

As for the other set of the common electrodes 5 and the first pixel electrode 11 for generating the lateral field, the first pixel electrode 11 is still thick, i.e., 200 to 500 nm. However, since the first interlayer insulating film 12 and the second interlayer insulating film 26 are formed over the substrate to cover the other set of the electrodes, height of steps formed below the alignment layer 13 is significantly smaller than that observed in the conventional structure. Accordingly, a material for the alignment layer is formed with high flatness on the second interlayer insulating film 26 and the material can be uniformly rubbed in a subsequent step, thereby allowing uniformity of the alignment layer 13 over the substrate.

Figure 1:
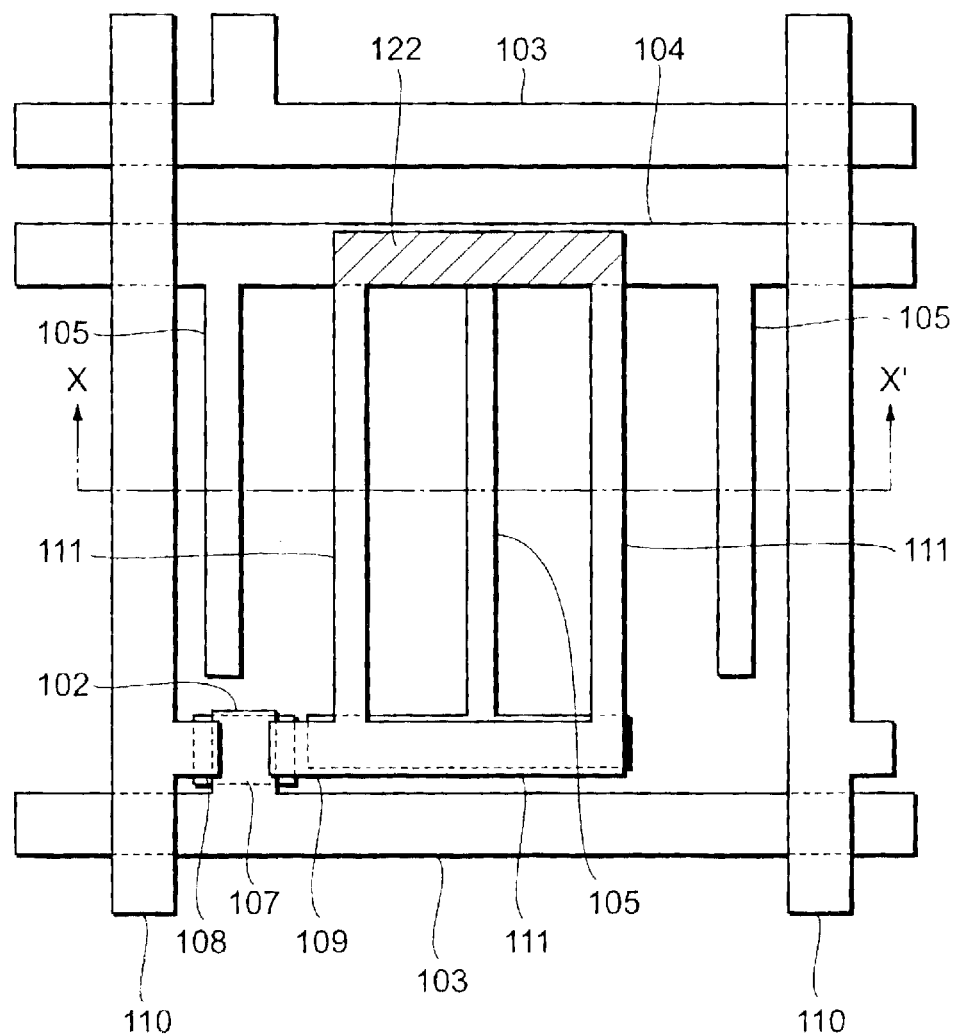
FIG. 1 is a plan view of one pixel portion of a TFT substrate of a conventional liquid crystal display device.
Figure 2:
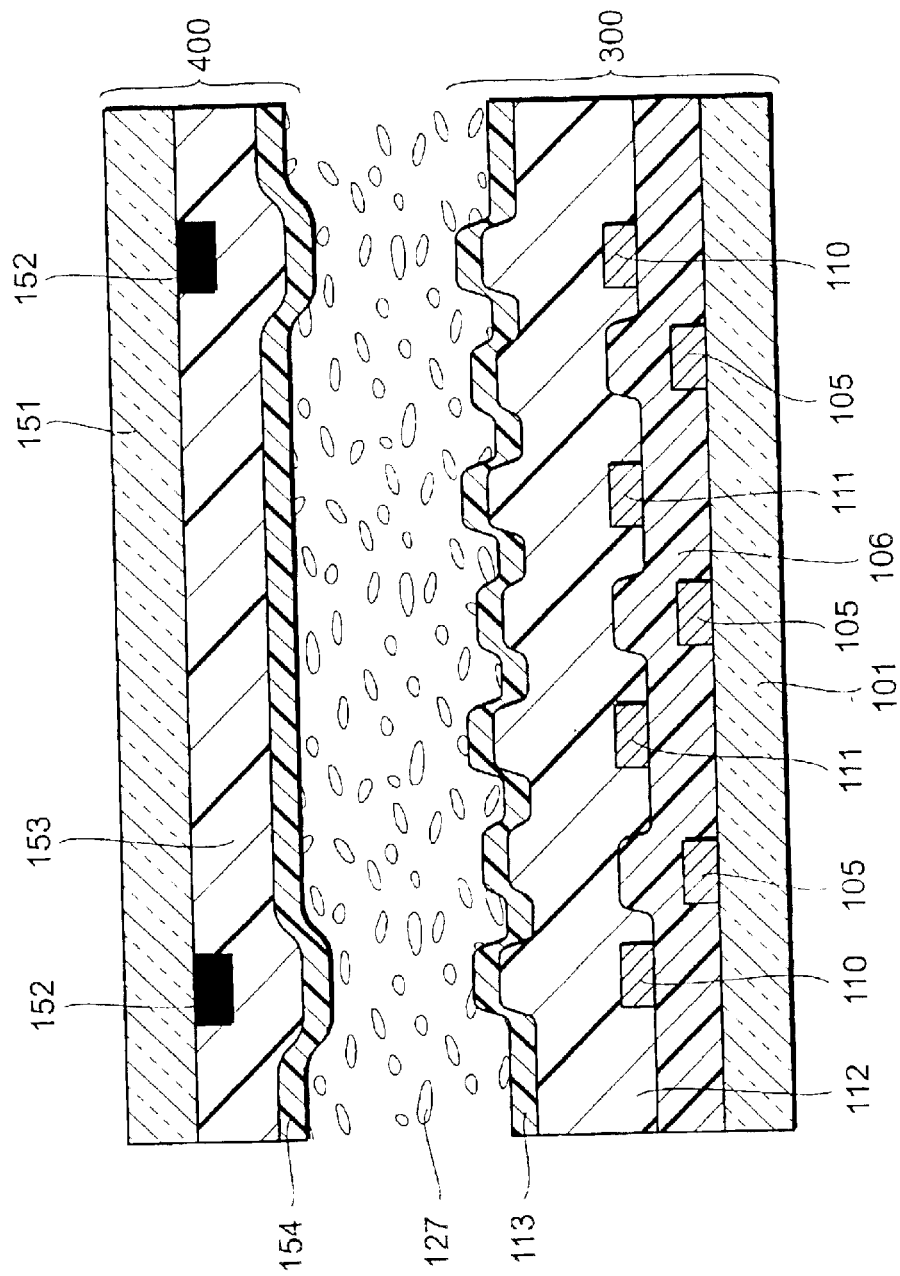
FIG. 2 is a cross-sectional view taken along the line X–X' of FIG. 1.

The liquid crystal display device including the above-described uniform alignment layers exhibits noticeable advantages, particularly, when the display device is used as a liquid crystal display device performing monochromatic display. In this case, the contrast obtained by dividing the white luminance by the black luminance has been proven to increase 1.5 times that observed using the liquid crystal display apparatus having the structure shown in FIGS. 1 and 2.

In the embodiment, although the second interlayer insulating film is formed thicker than the first interlayer insulating film, the second interlayer insulating film may be formed thinner than the above-described thickness depending on a contrast allowed in a liquid crystal display device. In addition, the second interlayer insulating film may be formed using an organic film instead of the inorganic film, allowing the second interlayer insulating film to be thinner than the first interlayer insulating film.

The present embodiment has been described with reference to the example including the storage electrode. However, even in the structure including no storage electrode, it is apparent that equivalent advantages can be obtained by providing pixel electrodes and common electrodes in a layer different from those for the signal and common lines.

As described above, according to the liquid crystal display device of the present invention, the major electrodes for generating the lateral electric field are formed in a layer different from layers for other electrodes and lines, and further, formed thinner than the other electrodes and lines. Therefore, flatness of an underlying film for an alignment layer is significantly improved and a material for the alignment layer also can be formed with high flatness on the underlying film, and further, rubbing of the alignment layer material can therefore be performed uniformly over the substrate. Consequently, the uniformly rubbed alignment layer is obtained and the liquid crystal display device is able to significantly enhance its contrast.

What is claimed is:

1. A lateral electric field liquid crystal display device comprising:
   a thin-film transistor (TFT) substrate comprising a signal line, a common line, a pixel electrode and a common electrode, said pixel electrode being partially formed in a layer which is different from and above said signal line and said common line, said common electrode being formed in said layer, and said common electrode and a portion of said pixel electrode formed in said layer having thicknesses which are less than thicknesses of said signal line and said common line;
   an opposing substrate; and
   a liquid crystal layer formed between said TFT substrate and said opposing substrate.

2. The lateral electric field liquid crystal display device according to claim 1, wherein the pixel electrode further comprises an auxiliary capacitive electrode formed in the same layer as that used for said signal line and formed to overlap said common line.

3. The lateral electric field liquid crystal display device according to claim 1, wherein said portion of said pixel electrode is connected to a drain electrode of a thin film transistor (TFT) through a contact hole and said common electrode is connected to said common line through a contact hole.

4. The lateral electric field liquid crystal display device according to claim 1, wherein said TFT substrate further comprises:
   a transparent substrate;
   a scanning line formed on said transparent substrate;
   a gate insulating film formed on said transparent substrate to cover said scanning line;
   a semiconductor layer formed on said gate insulating film;
   a first interlayer insulating film formed on said gate insulating film to cover said semiconductor film;
   a second insulating film formed on said first insulating film; and
   an alignment layer formed on said second insulating film,
   and wherein said common line is formed on said transparent substrate together with said scanning line, and wherein said signal line is formed between said gate insulating film and said first interlayer insulating film and is connected to one end of said semiconductor film, and wherein said pixel electrode includes a lower-layer pixel electrode formed on said gate insulating film together with said signal line and connected to the other end of said semiconductor film, and wherein said common electrode is formed between said first interlayer insulating film and said second interlayer insulating film and connected to said common line, and wherein said pixel electrode further includes an upper-layer pixel electrode formed on said first interlayer insulating film together with said common electrode and connected to said lower-layer pixel electrode, and wherein said upper-layer pixel electrode is thinner than said signal line and said common line.

5. The lateral electric field liquid crystal display device according to claim 4, wherein a thickness of each of said common electrode and said upper-layer pixel electrode is in a range of a twentieth to a third of a thickness of each of said signal line and said common line.

6. The lateral electric field liquid crystal display device according to claim 4, wherein a voltage is applied between said common electrode and said upper-layer pixel electrode and between said common electrode and said lower-layer pixel electrode to make liquid crystal molecules of said liquid crystal layer rotate within a plane parallel to said transparent substrate.

7. The lateral electric field liquid crystal display device according to claim 4, wherein a portion of said lower-layer pixel electrode comprises an auxiliary capacitive electrode.

8. The lateral electric field liquid crystal display device according to claim 1, wherein a portion of said pixel electrode formed in said layer is connected to a source/drain electrode of a thin film transistor through a contact hole and said common electrode is connected to said common line through a contact hole.

9. The lateral electric field liquid crystal display device according to claim 1, wherein said TFT substrate further comprises:
   a transparent substrate; and
   a scanning line formed on said transparent substrate,
   wherein said common line is formed on said transparent substrate together with said scanning line.

10. The lateral electric field liquid crystal display device according to claim 9, wherein said TFT substrate further comprises:
    a gate insulating film formed on said transparent substrate to cover said scanning line;
    a semiconductor layer formed on said gate insulating film; and
    a first interlayer insulating film formed on said gate insulating film to cover said semiconductor layer.

11. The lateral electric field liquid crystal display device according to claim 10, wherein said signal line is formed between said gate insulating film and said first interlayer insulating film and is connected to one end of said semiconductor layer.

12. The lateral electric field liquid crystal display device according to claim 10, wherein said pixel electrode includes a lower-layer pixel electrode formed on said gate insulating film together with said signal line and connected to the other end of said semiconductor layer.

13. The lateral electric field liquid crystal display device according to claim 12, wherein said pixel electrode further includes an upper-layer pixel electrode formed on said first interlayer insulating film together with said common electrode and connected to said lower-layer pixel electrode.

14. The lateral electric field liquid crystal display device according to claim 13, wherein a thickness of said upper-layer pixel electrode is less than thicknesses of said signal line and said common line.

15. The lateral electric field liquid crystal display device according to claim 10, wherein said TFT substrate further comprises:
a second interlayer insulating film formed on said first interlayer insulating film.

16. The lateral electric field liquid crystal display device according to claim 15, wherein said common electrode is formed between said first interlayer insulating film and said second interlayer insulating film and connected to said common line.

17. The lateral electric field liquid crystal display device according to claim 15, wherein said TFT substrate further comprises:
an alignment layer formed on said second interlayer insulating film.

18. A liquid crystal display device, comprising:
a thin-film transistor (TFT) substrate comprising:
a first layer comprising:
a signal line; and
a common line; and
a second layer formed above said first layer, comprising:
a portion of a pixel electrode; and
a common electrode, said common electrode and said portion of said pixel electrode formed in said second layer having thicknesses which are less than thicknesses of said signal line and said common line;
an opposing substrate; and
a liquid crystal layer formed between said TFT substrate and said opposing substrate.

19. A method of preparing a transparent substrate for a liquid crystal display device, comprising:
forming a common line on said transparent substrate;
forming a signal line and a first pixel electrode on said transparent substrate;
forming a first interlayer insulation layer on said transparent substrate and over said signal line and said first pixel electrode; and
forming a common electrode and a second pixel electrode on said first interlayer insulating layer,
wherein said common electrode and said second pixel electrode have thicknesses which are less than thicknesses of said signal line and said common line.

* * * * *